United States Patent [19]

Paffenholz

[11] Patent Number: 5,396,472
[45] Date of Patent: Mar. 7, 1995

[54] METHOD FOR DERIVING WATER BOTTOM REFLECTIVITY IN DUAL SENSOR SEISMIC SURVEYS

[75] Inventor: Josef Paffenholz, Missouri City, Tex.
[73] Assignee: Western Atlas International, Houston, Tex.
[21] Appl. No.: 128,596
[22] Filed: Sep. 24, 1993
[51] Int. Cl.$^6$ .............................................. G01V 1/38
[52] U.S. Cl. ........................................ 367/24; 367/21
[58] Field of Search ..................... 367/15, 21, 24, 38, 367/46; 181/110

[56] References Cited

U.S. PATENT DOCUMENTS

| | | | |
|---|---|---|---|
| 4,146,871 | 3/1979 | Ruehle | 367/24 |
| 4,234,938 | 11/1980 | Allen et al. | 367/24 |
| 4,486,865 | 12/1984 | Ruehle | 367/24 |
| 4,935,903 | 6/1990 | Sanders et al. | 367/24 |
| 4,979,150 | 12/1990 | Barr et al. | 367/24 |
| 5,163,028 | 11/1992 | Barr et al. | 367/13 |

OTHER PUBLICATIONS

Lowenthal, et al, *Deterministic Estimation of a Wavelet Using Impedence Type Technique*, Geophysical Prospecting 33, 956–969, 1985.

Potts, et al, *Amplitude Balancing and Approaches to Optimum Stack*, Jul. 1986.

Anstey, *The Sectional Auto–Correlogram and the Sectional Retro–Correlogram*, pp. 1–38, Reprinted from Geophysical Prospecting, v. 14, No. 4, pp. 389–426, (1966).

Barr, et al, *Attenuation of Water–Column Reverberations Using Pressure and Velocity Detectors in a Water–Bottom Cable*, Society of Exploration Geophysicists, 59th Annual Meeting, Oct. 29–Nov. 2, 1989.

Barr, et al, *A Dual–Sensor, Bottom–Cable 3–D Survey in the Gulf of Mexico*, Society of Exploration Geophysicists, 60th Annual Meeting, Sep. 23–27, 1990.

Backus, *Water Reverberations–Their Nature and Elimination*, Geophysics vol. XXIV, No. 2 (Apr., 1959), 233–261, 20 FIGS.

Primary Examiner—Ian J. Lobo
Attorney, Agent, or Firm—Arnold, White & Durkee

[57] ABSTRACT

A method for determining water bottom reflectivity in dual sensor seismic surveys is disclosed. The method eliminates the need for a separate survey to collect calibration data. The method involves summing the pressure and velocity signals, and multiplying the result by the inverse Backus operator, and then solving for the ocean bottom reflectivity R utilizing an optimization algorithm.

Also disclosed is a method for combining the dual sensor data which results in the complete elimination of the first order peg-leg multiples and the modulation of the sub-surface reflector strength with the ocean bottom reflectivity. The method involves summing the pressure and velocity signals, and multiplying the result by the inverse Backus operator containing the correct value for the ocean bottom reflectivity R found with the method described above.

6 Claims, 5 Drawing Sheets

METHOD FOR DERIVING WATER BOTTOM REFLECTIVITY IN DUAL SENSOR SEISMIC SURVEYS

FIELD OF THE INVENTION

The present invention relates generally to methods for collecting seismic data utilizing both pressure (hydrophone) and velocity (geophone) detectors on the sea floor. More specifically, the present invention relates to a method for determining water bottom reflectivity without the necessity of collecting separate reference or calibration data.

DESCRIPTION OF THE RELATED ART

In marine seismic exploration, a seismic survey ship is equipped with an energy source and a receiver for taking seismic profiles of an underwater land configuration. The act of taking profiles is often referred to as "shooting" due to the fact that explosive devices have been commonly used for many years as energy sources. The energy source is designed to produce compressional waves that propagate through the water and into the underwater land formation. As the compressional waves propagate through the land formation, they strike interfaces between formations, commonly referred to as strata, and reflect back through the earth and water to the receiver. The receiver typically converts the received waves into electrical signals which are then processed into an image that provides information about the structure of the subterranean formation.

Presently, one of the most common energy sources is an air gun that discharges air under very high pressure into the water. The discharged air forms a pulse which contains frequencies within the seismic range. Another energy source which is frequently used is a marine vibrator. Marine vibrators typically include a pneumatic or hydraulic actuator that causes an acoustic piston to vibrate at a range of selected frequencies. The vibrations of the acoustic vibrator produce pressure differentials in the water which generate seismic pulses free from spurious bubbles.

Just as different energy sources may be used to generate seismic waves in marine applications, different receivers may be used to detect reflected seismic waves. Typically, the receivers most commonly used in marine applications are referred to as hydrophones. Hydrophones convert pressure waves into electrical signals that are used for analog or digital processing. The most common type of hydrophone includes a piezoelectric element which converts physical signals, such as pressure, into electrical signals. Hydrophones are usually mounted on a long streamer which is towed behind the survey ship at a depth of about 30 feet.

Alternatively, marine seismic techniques may use different types of receivers which detect different characteristics of the environment. For instance, in bottom-cable seismic recording, a combination of pressure sensitive transducers, such as hydrophones, and particle velocity transducers, such as geophones, can be deployed on the marine bottom. While geophones are typically used in land operations where metal spikes anchor the geophones to the ground to ensure fidelity of geophone motion to ground motion, geophones cannot be economically anchored in marine applications. Therefore, cylindrical, gimbal geophones are attached to the bottom-cable. After the cable is deployed from the seismic survey ship, the geophones simply lie in contact with the marine bottom where they fall. The gimbal mechanism inside the cylinder assures that the geophone element mounted therein is oriented vertically for proper operation.

As is obvious from the above discussion, a variety of seismic equipment and techniques may be used in an attempt to accurately plot the underwater land formation. Regardless of which technique or combination of equipment is used, each offers certain advantages and disadvantages when compared to one another. For instance, gathering seismic data with a towed streamer in areas populated with numerous obstacles, such as drilling and production platforms, can be difficult or even impossible because the streamer may strike one of the obstacles and tear loose from the towing vessel. Such an event represents an extremely costly loss.

By contrast, in bottom-cable seismic operations, no such difficulty exists because the cable is deployed in a fixed position on the water bottom.

The use of water bottom cables is particularly effective in obtaining full three dimensional coverage in areas too congested with obstacles for normal towed streamer operations. Typically, ten miles of bottom cable are deployed along a line of planned positions.

While the bottom cable technique allows access to areas denied by the towed streamer method, a "ghost" reflection from the air water interface (and subsequent reverberations) occur for each reflection wave. The time delay between reflection wavelet and "ghost" reflection is greater with the bottom cable method than with the towed streamer method because the detectors are farther removed from the air-water interface, except in shallow water.

Two basic approaches have been proposed in the literature for eliminating the "ghost" reflection. The first involves recording signals from detectors at different depths and performing a wave field separation. See "Two Trace Directional Filter For Processing Offset USP's", D. W. Bell & V. D. Cox, presented at the 57th Annual Meeting of the SEG, New Orleans, La. (1987). See also "Marine Seismic Exploration Using Vertical Receiver Arrays: A Means For Reduction Of Weather Downtime", M. Brink & M. Svendsen, presented at the 57th Annual Meeting of the SCG, New Orleans, La. (1987).

The second, and operationally more straightforward method, utilizes paired pressure and velocity detectors at identical locations. See U.S. Pat. No. 2,757,356 (Hagarty). See also "Deterministic Estimation Of A Wavelet Using Impedance Type Technique" D Lowenthal S. S. Lee & G. H. F. Gardner, *Geophysical Prospecting*, Volume 33 at 956–69 (1985). See also "Bottom Cable Exploration In The Gulf of Mexico: A New Approach", T. B. Rigsby, W. J. Cafarelli & D. J. O'Neill, presented at 57th Annual Meeting of the SCG, New Orleans, La. (1987). This second method capitalizes upon the fact that two detectors generate signals which are the same polarity for upward travelling waves but are of opposite polarity for downward travelling waves (the "ghost" reflection).

In "A Dual Sensor, Bottom Cable 3-D Survey In The Gulf of Mexico", Barr et al., presented at the 60th Annual Meeting of the Society of Exploration Geophysics (1990), a dual sensor bottom cable method is described to eliminate the water column reverberations resulting from the simultaneous use of both pressure and velocity sensors. The method involves recording simultaneously data from both pressure and velocity sensors at each receiver location. In the time domain, the initial part of the signal containing a desired reflection wavelet is identical in wave form and polarity in both the pressure and velocity sensor data. All subsequent reverberations show the same wave form but are opposite in polarity. This indicates that the two signals can be properly scaled and summed to eliminate the unwanted reverberations associated with each reflection. In the frequency domain, this relationship expresses itself in the complimentary amplitude spectra of the two sensors. When the signals are properly summed, a smooth amplitude spectrum results.

Thus, unwanted reverberations may be eliminated by summing the pressure trace and the velocity trace. For example, in "Attenuation Of Water Column Reverberations Using Pressure And Velocity Detectors In A Water Bottom Cable", F. Barr & J. Sanders, presented at the 59th Annual Meeting of the Society of exploration Geophysicists in Dallas (1989), a method is described for combining the two signals recorded at each station, resulting in the virtual elimination of water column reverberations associated with each reflectional wavelet in the data. The method described by Barr & Sanders is beneficial for bottom cable data gathered in water of any depth. However, the method is especially applicable when operating in water deeper than approximately fifty feet, because the period of the water column reverberations exceeds that with which deconvolution algorithms effectively deal.

Proper combination of the pressure and velocity signals, in order to remove energy which is trapped in the water layer, can only be performed after scaling the geophone signal by a scale factor $S=(1+R)/(1-R)$ where R is the ocean bottom reflectivity.

The scale factor for the velocity detector signals requires determining the water bottom reflectivity coefficient R, which depends upon the acoustic impedance of the bottom material. The scale factor can be expected to vary among receiver different locations.

In the past, a calibration survey has been used to estimate the ocean bottom reflectivity. In the dual sensor operations described above, an estimate of the reflectivity R is made by collecting separate reference information, generated by shooting a small seismic source directly over the receivers. The collection of this survey data requires additional time and cost over and above the data acquisition phase of the survey.

In such a calibration survey, as depicted in FIG. 2, a low energy source is fired over each receiver pair and the scalar is determined from the ratio of the peaks of the first arrivals ("first breaks") of the hydrophone and geophone signals. As is conventional in the prior art, after the cable has been deployed on the marine bottom 20, as illustrated in FIG. 2 (prior art), the survey ship 12 performs a calibration shooting operation. The calibration operation includes recording the responses of the geophones 34 and hydrophones 36 to a downwardly propagating seismic wave produced by the seismic energy source 14. The seismic energy source 14 generates a wavefront 64 having a waveform w(t), which is referred to as the primary wave generated by the seismic energy source 14.

During production shooting, the source 14 includes an array of air guns which are fired simultaneously. However, during the calibration shooting operation, firing the entire array may overdrive the receivers 18. Therefore, only a portion of the air gun array, such as one or two guns, is used during calibration. As will be recognized by those skilled in the art, the number of guns used depends on parameters such as water depth, air gun volume, and the electrical characteristics of the receivers.

However, with a conventional seismic source, and shallow water, the early part of the signals may sometimes be of such high amplitude that they overdrive the recording system, and the signals will be "clipped". Therefore, the method using first breaks is unsuited for production data because the early part of the seismic trace is often too high in amplitude to be recorded properly and instead overdrives the recording instruments. Additionally, in a production setting, the near offset, which is the closest lateral distance between the seismic energy source and receiver, may not be a short enough distance so that the trace data from the direct wave will not be contaminated by refracted energy. Refracted energy is a wave which travels through the strata below the ocean bottom, reaching the receiver before the direct wave reaches the receiver, i.e., when the seismic energy source is laterally displaced from the receiver.

The present invention is directed to overcoming, or at least minimizing, one or more of the problems set forth above.

Therefore, one objective of this invention is to derive ocean bottom reflectivity from production data without relying on the ratio of the "first breaks". Another objective of this invention is to derive ocean bottom reflectivity that is not affected by "clipped" first signals. A third objective of the present invention is to provide a method of combining trace data to eliminate peg-leg reverberations.

SUMMARY OF THE INVENTION

The present invention involves a method for deriving the correct scalars for the hydrophone and geophone pair without the collection of separate reference or calibration data of sea bottom reflectivity. The method of this invention provides such scalars even in the presence of "clipped" or contaminated "first break" energy.

The method described involves the determination of the signal which contains only up-going energy, convolution of this signal with the inverse Backus filter $(1+RZ)^2$, and an optimization procedure to determine the correct value for ocean bottom reflectivity R.

Convolution of the trace containing only up-going energy with the inverse Backus filter $(1+RZ)^2$ containing the correct value for the ocean bottom reflectivity R results in a trace where the water layer reverberations of the first order are eliminated.

The method of the present invention also involves the combination of trace data to eliminate peg-leg reverberations.

DETAILED DESCRIPTION OF A PREFERRED EMBODIMENT

Figure 1:
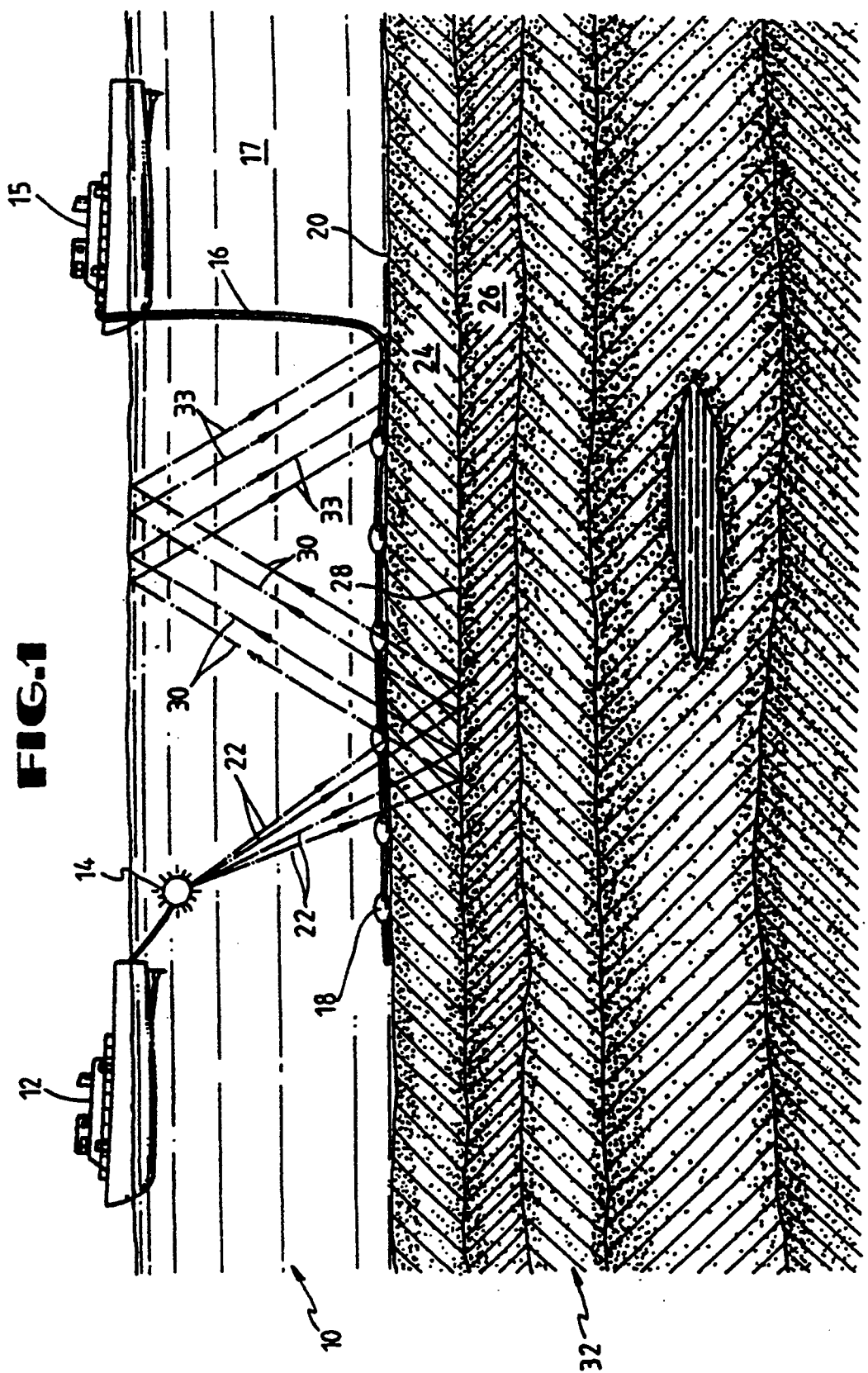
FIG. 1 illustrates apparatus used in a bottom-cable operation.
Figure 2:
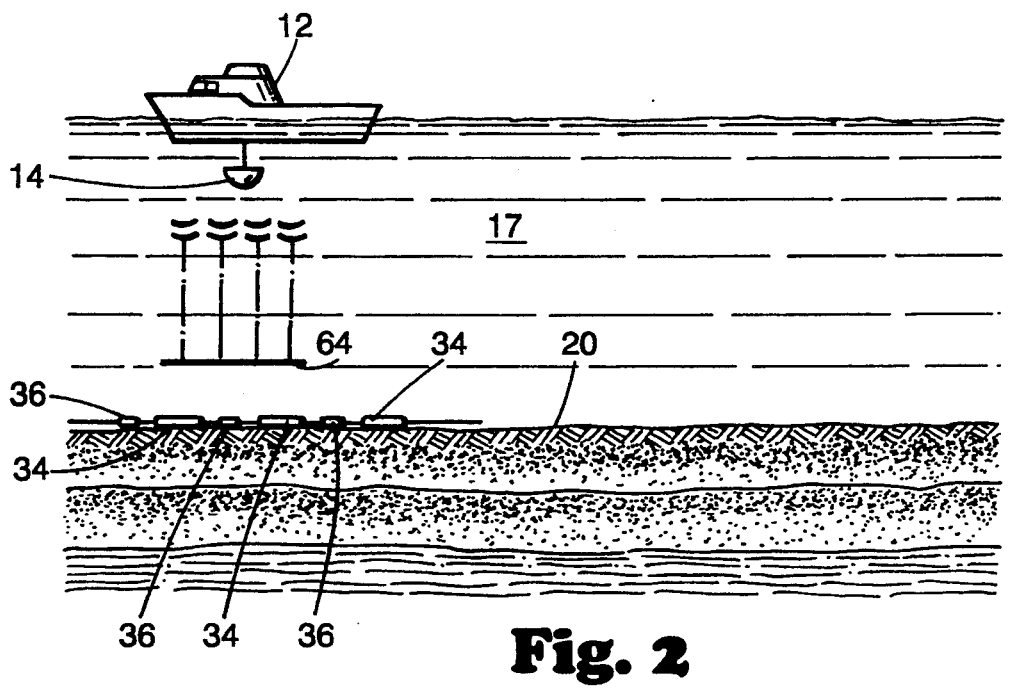
FIG. 2 illustrates the prior art method for calibration wherein a downwardly propagating pressure wave impinges on the hydrophone/geophone pairs on the sea bottom.

Turning now to the drawings and referring initially to FIG. 1, a preferred marine seismic survey system is illustrated and generally designated by a reference numeral 10. The system 10 includes a seismic survey ship 12 that is adapted for towing a seismic energy source 14 through a body of water 17. The seismic energy source 14 is an acoustic energy source or an array of such sources. An acoustic energy source preferred for use with the system 10 is a compressed air gun, called a "sleeve gun", which is commercially available from Halliburton Geophysical Services, Inc. of Houston, Tex. The source 14 is constructed and operated in a manner conventional in the art.

The system 10 also includes a receiving ship 15 that is preferably anchored in the body of water 17. The receiving ship 15 deploys a cable 16 on the marine bottom 20, and receives signals from the cable 16 as will be subsequently explained in detail. One preferred cable is commercially available from Tescorp Seismic Products Co. of Houston, Tex., but those skilled in the art recognize that any one of a wide variety of cables can be used. The cable 16 carries at least one receiver 18, but preferably includes a plurality of such units.

The receiver 18 includes a hydrophone for detecting water pressure and a geophone for detecting water-bottom particle velocity. More particularly, the hydrophones and geophones on the cable 16 are arranged in identical spatial arrays when deployed on the marine bottom 20. Each individual hydrophone has a gimballed geophone positioned next to it. A separate electrical signal is sent to a recording system on the ship 15 for each hydrophone and each geophone spatial array. The survey ship 12 fires the source 14 at predetermined locations while the signals from the hydrophone and geophone arrays are recorded. These signals are typically referred to as reflection data. The data is recorded by a multi-channel seismic recording system that selectively amplifies, conditions and records time-varying electrical signals onto magnetic tape. Advantageously, the system also digitizes the received signals, using a 14 bit analog-to-digital converter for instance, to facilitate signal analysis. Preferably, the ship 15 utilizes a seismic recording system which is commercially available from Halliburton Geophysical Services, Inc. However, those skilled in the art will recognize that any one of a variety of seismic recording systems can be used.

According to a preferred practice, the cable 16 and hydrophone/geophone pair 18 are positioned on the marine bottom 20 for use in three-dimensional, "bottom-cable" operations. Normal production shooting takes place with the survey ship 12 moving at a constant speed along a set of parallel lines, or swath, with respect to the cable 16. After the survey ship 12 completes the swath, the receiving ship 15 or other suitable ship retrieves the cable 16 and re-deploys the cable 16 in a line spaced from, but parallel to, the previous cable location. Once the cable 16 is re-deployed, the survey ship 12 shoots another swath.

During data collection, seismic waves generated by the source 14 travel downwardly, as indicated by the rays 22. These primary waves are reflected off of interfaces between strata, such as the interface 28 between strata 24 and 26, in the subterranean earth formation 32. The reflected waves travel upwardly, as illustrated by the rays 30. The hydrophone/geophone pairs that make up each receiver 18 detect the reflected waves. The receivers 18 generate electrical signals representative of pressure and particle velocity changes inherent to the wave field, and transmit these generated electrical signals back to the survey ship 15 via the cable 16. The recording equipment within the ship 15 records these electrical signals so that they can be subsequently processed to map the subterranean earth formation 32.

It should be understood that the receivers 18 not only detect the reflected waves of interest, but also the primary wave and reverberated waves. Reverberated waves are reflected waves which reflect off of the water-air interface at the surface of the water 17 and travel downwardly in the water 17 to impinge on the receivers 18. Reverberated waves are illustrated by the rays 33 in FIG. 1. The effects of reverberated waves will be discussed subsequently.

Preferably, the geophone is a Model SG-1 which is commercially available from SENSOR Nederland b. v. of Voorschoten, Holland, and the hydrophone is a Model MP-24 which is commercially available from OYO Geospace Corp. of Houston, Tex. The geophone and hydrophone lie on the marine bottom, and together comprise a hydrophone/geophone pair. As mentioned previously, dual-sensor detection techniques offer certain advantages because hydrophones detect pressure variations and geophones detect particle velocity variations.

The one dimensional wave equation for a pressure wave is:

$$\frac{\partial^2 P}{\partial z^2} = \frac{1}{c^2} \frac{\partial^2 P}{\partial t^2} \qquad (1)$$

The most general solution is:

$$P = P^+ f(z-ct) + P^- f(z+ct) \qquad (2)$$

In the above equations, P is pressure, z is depth, c is wave velocity, and t is time.

Equation (2) represents a superposition of waves traveling in opposite directions. If the coordinate system is chosen where z increases with water depth, the first term $P^+ f(z-ct)$ denotes a downward traveling wave U and the second term $P^- f(z+ct)$ denotes an upward traveling wave D. We can therefore write:

$$P = D + U \qquad (3)$$

The velocity field is linked to the pressure field by Newton's law, where $\rho$ is the density of the material and V is particle velocity:

$$\rho \frac{\partial V}{\partial t} = -\frac{\partial P}{\partial z}$$

Replacing the pressure equation (2) into the above relationship yields the following equation:

$$\frac{\partial V}{\partial t} = -\frac{1}{\rho} P^+ f(z-ct) - \frac{1}{\rho} P^- f(z+ct)$$

Integrating with respect to time yields:

$$V = \frac{1}{\rho c} P^+ f(z-ct) - \frac{1}{\rho c} P^- f(z+ct)$$

Replacing the above terms with the definition from equation (2) and changing the sign of the velocity signal according to the SEG standard, we have:

$$V = \frac{-1}{\rho c}(D-U) = \frac{1}{\rho c}(U-D) \qquad (4)$$

Equations (3) and (4) form the backbone of dual sensor technology. It also will be understood that the summation of P and V results in the up-going wave U.

Figure 3:
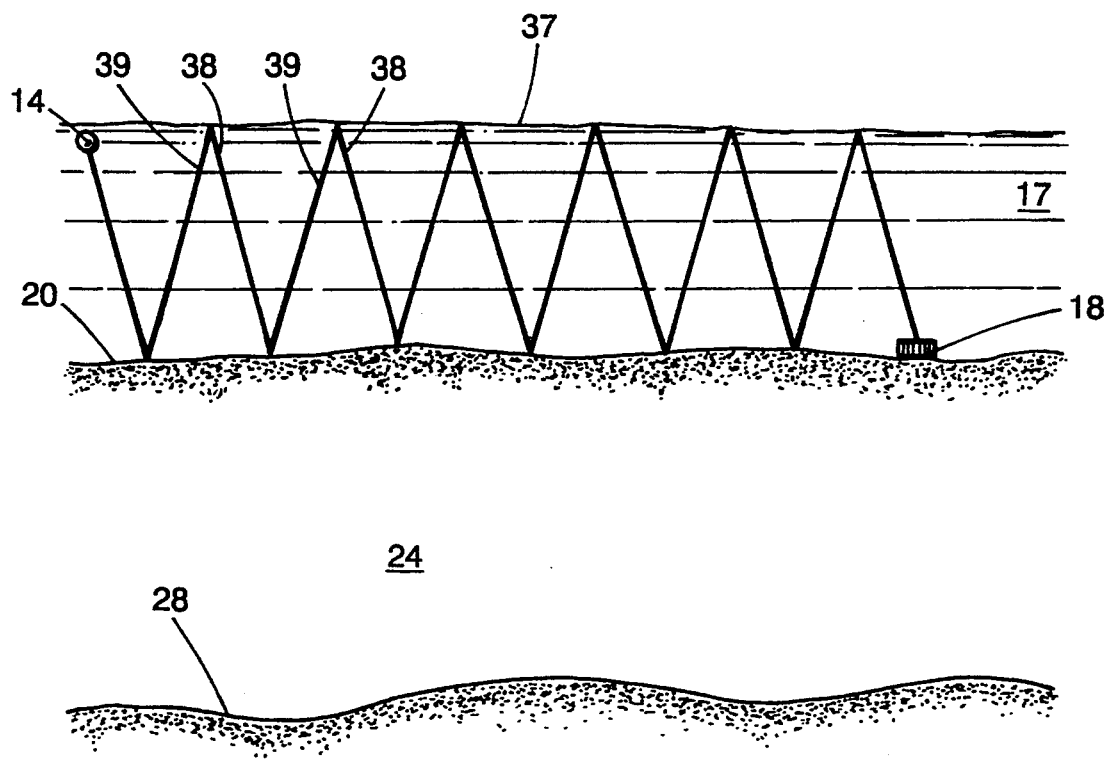
FIG. 3 illustrates the seismic wave field trapped in the water layer impinging on a geophone/hydrophone receiver pair.

Next, the wave field reverberations trapped in the water layer will be considered, as shown in FIG. 3. The wave field trapped in the water layer 17 with surface reflectivity $-1$ and bottom reflectivity R can be expressed as follows. The two-way travel time of the wave through only water layer 17 is $\tau_w$, the geophone and hydrophone receivers are at a depth so that the two-way travel time from the receiver pair 18 to the water bottom 20 is $\tau_s$ and the two-way travel time from the receiver pair to the water surface is $\tau_{s'}$. The seismic energy source 14 at or near the water surface (z=0) fires at time $t = -\tau_{s'}/2$. The pulse hits the receiver pair for the first time at t=0. The time domain representation of the down going wave field 38 trapped in the water layer 17, at the receiver pair position is:

$$D(t) = \delta(t) - R\delta(t - \tau_w) + R^2\delta(t - 2\tau_w) - R^3\delta(t - 3\tau_w).$$

The above equation represents the geometric series in the time domain for the down-going portion of water trapped reverberations 38, which become attenuated after multiple round trips through water layer 17. If the geometric series for water trapped reverberations is in the Z-Transform (Z=e $i\omega_w$) representation, the equation can be evaluated in closed form:

$$D(Z) = 1 - RZ + R^2Z^2 - R^3Z^3 + \ldots = \frac{1}{1+RZ} \qquad (5)$$

Similarly, the time domain representation of the up-going wave field 39 trapped in water layer 17, at the receiver pair position is:

$$U(t) = R\delta(t-\tau_{s'}) - R^2\delta(t-\tau_{s'}-\tau_w) + R^3\delta(t-\tau_{s'}-2\tau_w) - R^4\delta(t-\tau_{s'}-3\tau_w) + \ldots$$

The Z-transform representation of the up-going wave field is:

$$U(Z) = \qquad (6)$$

$$Z^{\frac{\tau_{s'}}{\tau_w}}(R - R^2Z^1 + R^3Z^2 - R^4Z^3 + \ldots) = Z^{\frac{\tau_{s'}}{\tau_w}} \frac{R}{1+RZ}$$

Essentially, the up-going wave field 39 for water trapped reverberations is a scaled and time delayed version of the down going wave field 38.

For bottom Cable surveys, the geophone and hydrophone are located on the ocean bottom 20. Thus, we must consider water trapped reverberations in the special case where the geophone and the hydrophone are located at the ocean bottom and where $\tau_s = \tau_w$. The pressure and velocity signals for the water trapped reverberations are:

$$P(Z) = \frac{1+R}{1+RZ}$$

$$V(Z) = \frac{-(1-R)}{1+RZ}$$

Figure 4:
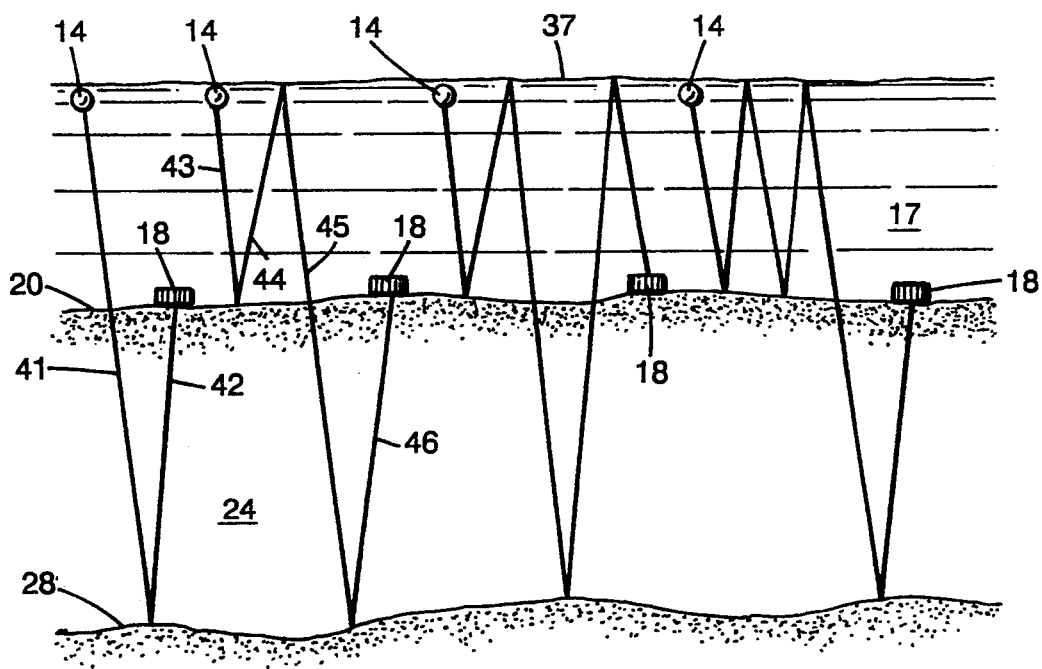
FIG. 4 illustrates four examples of wave paths through the water layer and subsurface strata for peg-leg reverberation sequences.

Now the peg-leg reverberations must be considered. Four examples of various permutations of peg-leg reverberations are depicted in FIG. 4. In the first example of FIG. 4, the downward travelling wave 41 from seismic energy source 14 travels downward through water layer 17 and strata 24 until reflecting off of interface 28 which provides a subsurface reflector. Then the upward travelling wave 42 moves back through strata 24 to the receiver pair 18. In the second example of FIG. 4, downward travelling wave 43 though water layer 17 is reflected from sea floor 20 and upward travelling wave 44 then moves back through water layer 17 to water surface 37. Downward travelling wave 45 then passes through water layer 17 and strata 24 until reaching interface 28, and upward travelling wave 46 passes through strata 24 to receiver pair 18. The remaining two examples in FIG. 4 are further permutations of peg-leg multiples, and it will be recognized that many others are possible.

First, for the treatment of peg-leg multiples, consider the case where an upward travelling wave from the interface 28 passes through the strata 24, across the ocean bottom 20, into the water layer 17. The time when the pulse hits the receiver pair 18 the first time will be t=0. The resulting reverberation sequence in the water layer for the up-going wave U(t) is:

$$U(t) = \delta(t) - R\delta(t-\tau_w) + R^2\delta(t-2\tau_w) + R^3\delta(t^3\tau_w) + \ldots$$

and for the down-going wave D(t) is:

$$D(t) = -\delta(t-\tau_s) + R\delta(t-\tau_s-\tau_w) - R^2\delta(t-\tau_s-2\tau_w) - R^3\delta(t-\tau_s-3\tau_w) + \ldots$$

The corresponding representations of the up-going wave U(Z) and down-going wave D(Z) in the Z-domain are:

$$U(Z) = 1 = RZ^1 + R^2Z^2 - R^3Z^3 + \ldots = \frac{1}{1+RZ} \qquad (9)$$

$$D(Z) = Z^{\frac{\tau_s}{\tau_w}}(1 - RZ^1 + R^2Z^2 - R^3Z^3 + \ldots) = -\frac{Z^{\frac{\tau_s}{\tau_w}}}{1+RZ} \qquad (10)$$

Now consider energy which crosses the water bottom and returns to the water layer from below after reflecting once from interface 28. To obtain the complete reverberation sequence, it must be considered that after each round trip through water layer 17, part of the energy penetrates water bottom 20 and is reflected from interface 28, after which the pulse is again trapped in water layer 17. This is the so called first order peg-leg reverberation sequence.

Let $\tau_e$ be the round trip time from ocean bottom 20 to the sub surface interface 28. At time $t = n\tau_w + \tau_e$, the up going pulse $U_n$ consists of all components which made n round trips through the water layer and one trip from ocean bottom 20 to the interface. The first order sequence is defined as a wave which reached the subsurface interface 28 once with water trapped reverberations before and after. The first component of the peg-leg up-going wave equation consists of the energy which made n round trips through water layer 17 after the interface 28. The second component has $n-1$ round trips in the water layer after the interface 28 and one round trip through the water layer before the interface. The third component has $n-2$ round trips after the interface and two before the interface. And so on for the fourth, fifth, sixth, etc. components for all combinations in the up-going peg-leg equation. Thus the up going wave field at delay $Z_n$ can be calculated from equation (9) as:

$$U(Z_n) = U(Z_0) \cdot U(Z_n) + U(Z_1) \cdot U(Z_n - 1) +$$
$$U(Z_2) \cdot U(Z_{n-2}) + \ldots = \sum_{m=0}^{\infty} U(Z_m) \cdot U(Z_{n-m}).$$

In the above equation, m is simply the counter for all possible delay times from zero to n. The up-going wave field equation is a convolution and the up going wave field of the peg-leg sequences is therefore the product of the square of the water layer reverberations $$\frac{1}{(1+RZ)}$$

and the time operator $$Z^{\frac{\tau_{s'} + \tau_e}{\tau_w}} : U(Z) = \frac{1}{(1+RZ)^2} Z^{\frac{\tau_{s'} + \tau_e}{\tau_w}} \quad (11)$$

The time delay operator brings the peg-leg sequence into synchronization with the water trapped reverberation corresponding to the time of firing the seismic energy source.

The down going part of the peg-leg sequence is reflected at the water surface 37 and is delayed by the two-way travel time $$Z^{\frac{\tau_s}{\tau_w}}$$

between surface 37 and receivers 18, thus:

$$D(Z) = \frac{-Z^{\frac{\tau_s}{\tau_w}}}{(1+RZ)^2} Z^{\frac{\tau_{s'} + \tau_e}{\tau_w}} \quad (12)$$

Combination of equations (5)–(6) and (11)–(12) leads to the following equations for the up-going wave $U(Z)$ and down-going wave $D(Z)$. In each equation, the first term is the water trapped reverberations and the second term is the peg-leg sequence.

$$U(Z) = \quad (13)$$

$$Z^{\frac{\tau_{s'}}{\tau_w}} \frac{R}{1+RZ} + (1-R^2) \frac{1}{(1+RZ)^2} \sum_{n=1}^{l} R_n Z^{\frac{\tau_{s'} + \tau_{en}}{\tau_w}}$$

$$D(Z) = \frac{1}{1+RZ} + (1-R^2) - \frac{Z^{\frac{\tau_s}{\tau_w}}}{(1+RZ)^2} \sum_{n=1}^{l} R_n Z^{\frac{\tau_{s'} + \tau_{en}}{\tau_w}} \quad (14)$$

In the above equations, $(1-R)^2$ accounts for the amplitude loss caused by the two transmissions through ocean bottom 20 and Rn is the reflectivity of the n-th of the l sub surface layers, as shown in FIG. 1 by reference numerals 24, 26, etc.

If the receivers 18 are located on the ocean bottom 20, then $\tau_s = \tau_w$ and $\tau_{s'} = 0$. Therefore, equations (13) and (14) simplify to:

$$U(Z) = \frac{R}{1+RZ} + (1-R^2) \frac{1}{(1+RZ)^2} \sum_{n=1}^{l} R_n Z^{\frac{\tau_{en}}{\tau_w}} \quad (15)$$

$$D(Z) = \frac{R}{1+RZ} + (1-R^2) \frac{1}{(1+RZ)^2} \sum_{n=1}^{l} R_n Z^{\frac{\tau_{en}}{\tau_w}} \quad (16)$$

Since the summation of the pressure and velocity signals are the down-going wave, the pressure and velocity signals are:

$$P(Z) = \frac{1+R}{1+RZ} + (1-R^2) \frac{1-Z}{(1+RZ)^2} \sum_{n=1}^{l} R_n Z^{\frac{\tau_{en}}{\tau_w}} \quad (17)$$

$$V(Z) = \frac{-(1-R)}{1+RZ} + (1-R^2) \frac{+1+Z}{(1+RZ)^2} \sum_{n=1}^{l} R_n Z^{\frac{\tau_{en}}{\tau_w}} \quad (18)$$

The first term in each equation above describes the water trapped reverberation, and the second term describes the first order peg-leg multiples. The terms $(1-Z)$ and $(1+Z)$ are the so called "ghost" responses for the pressure and velocity signals, respectively. The term $1/(1+RZ)^2$ is the Backus filter.

Summation of the pressure signal and the velocity signal gives the up-going energy only (Eq. 15), thus eliminating the "ghost" signal. After a sufficient amount of time, the water trapped reverberation dies off and only the peg-leg reverberations described by the Backus operator remain.

The peg-leg multiple sequence can be eliminated if the up-going signal $U(Z)$ is multiplied with the inverse Backus operator $(1+RZ)^2$. Because the multiplication of the Backus operator (having the correct value of ocean bottom reflectivity R) leads to the elimination of the peg-leg multiples, the resulting trace will have the minimum amount of overall power. Accordingly, determining the trace having the minimum amount of power can be used to recognize the correct value R for ocean bottom reflectivity.

Therefore, the present invention provides an improved method for determination of the value R for ocean bottom reflectivity using the inverse Backus filter.

A number of established algorithms can be employed to determine the trace having the minimum amount of power, such as the Levenberg-Marquardt method described in the book "Numerical Recipes" by William H. Press et al. The optimal solution may even be determined by an exhaustive search in which the value R for ocean bottom reflectivity is varied and the power in the resulting trace (after multiplication with the Backus operator) is measured. The value of R which results in the lowest power is the correct reflectivity value.

In a preferred embodiment, the optimization sequence may be performed using a subroutine added to the TIPEX seismic processing system available from Halliburton Energy Services.

---
SUBROUTINE GET R
---
FOR ALL SHOT RECORDS
    FOR ALL TRACES
        READ P-TRACE
        READ V-TRACE
        TIME WINDOW TRACES (E.G. 800–2000 MS BELOW FIRST BREAK)
        SUM WINDOWED TRACES (P+V)
        COMPUTE SPECTRUM S(Z)=FFT(P+V)
        DO R=−0.8, 0.8,0.05
            S1(Z)=S(Z)*(1+RZ)$^2$
            COMPUTE TOTAL POWER IN SELECTED BANDWIDTH
        END DO
        SELECT R WHICH MINIMIZES TOTAL POWER
        WRITE OUR R AND RECEIVER NUMBER
    NEXT TRACE
NEXT SHOT RECORD
AVERAGE R VALUES FOR EACH RECEIVER
END
---

Figure 6:
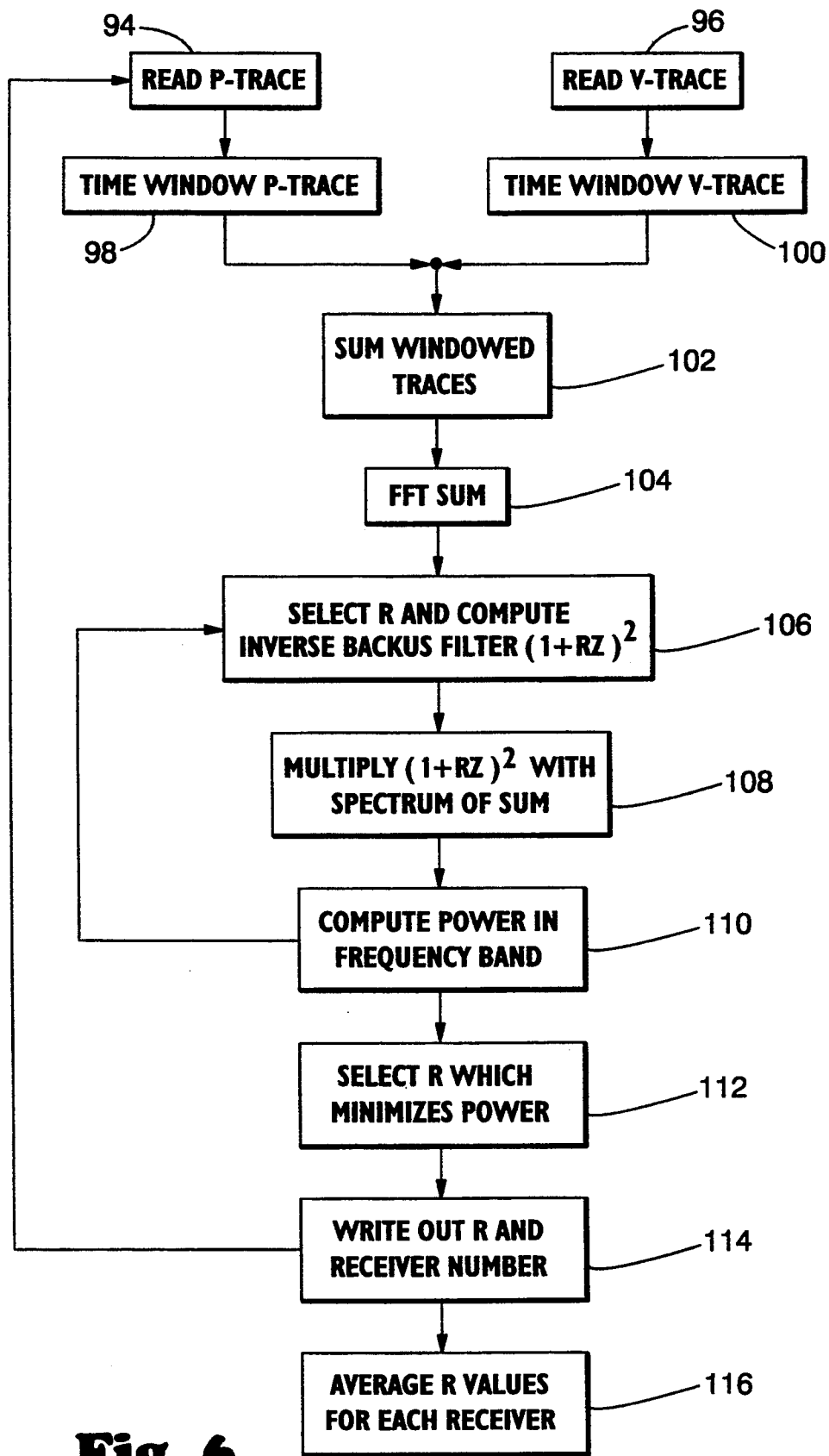
FIG. 6 is a flow diagram of the preferred implementation of the present invention using the inverse Backus filter.

FIG. 6 illustrates a flow diagram which represents a preferred way to perform the method of determining ocean bottom reflectivity R. Preferably, a Model 3090 IBM mainframe computer running a "TIPEX" operating system (commercially available from Halliburton Geophysical Services, Inc. of Houston, Tex.) is used to process the reflection data.

First, in blocks 94 and 96, the geophone data trace (V-trace) and hydrophone data trace (P-trace) are obtained. Next in blocks 98 and 100, a time window is applied to the P-trace and V-trace. Preferably, the time window, counting from the first break, is in the range of 0.8 to 2.5 seconds. In contrast, the time window used for the prior art first arrival method employed a time window in the range of 20 to 100 milliseconds, depending on water depth. Next, in block 102, the windowed traces are summed as described in equations (17) and (18). Then, in block 104 the Fourier transform of the sum is determined, to transform the sum from the time domain to the frequency domain. Next, in block 106, a value of R is selected and the inverse Backus filter is computed for that value. In block 108, the inverse Backus filter is multiplied with the Fourier transform of the sum of the windowed traces.

Next, in block 110, the power in the selected frequency band is computed. Preferably, the frequency band is in the range of 15 to 80 Hertz. In block 112, the value of R is selected which minimizes total power. The value of R is written out for the receiver number, in block 114, and the program logic moves back to read the traces for the next receiver. After traces for all the receivers are determined, the R values are averaged for each receiver, in block 116.

This processing sequence of the present invention provides several important advantages over alternative methods.

First, the method described in this application is advantageous because ocean bottom reflectivity is determined on a receiver by receiver basis, rather than reordering shot records from multiple receivers. Thus, one advantage of the proposed method is that it is a single-channel process, so no expensive reordering of the shot records to Common Receiver Points (CRP) is necessary.

Figure 5:
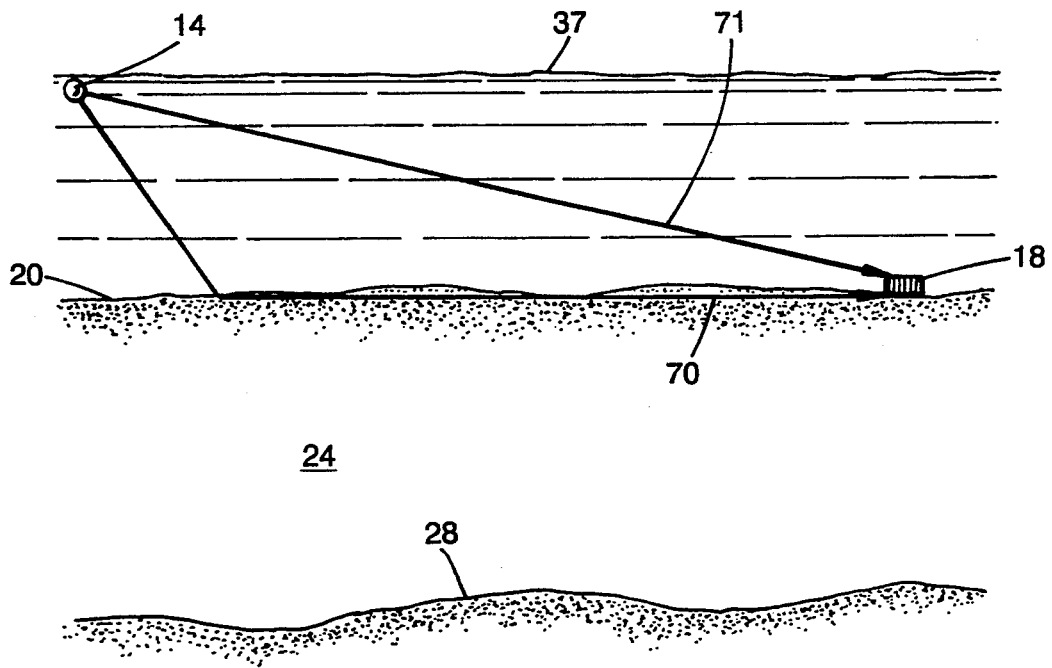
FIG. 5 illustrates the problems associated with using the first breaks in production shooting.

Second, the method works with the deeper parts of the traces and is thus not disturbed by refracted energy. FIG. 5 shows a refracted wave 70 which may reach the receivers 18 before the direct wave 71. In the prior art methods, the refracted wave 70 would tend to disturb the signals. The method of the present invention uses a part of the trace reflected from deep strata, so near vertical incidence to the geophones is ensured. Therefore, even large offset traces (such as shown in FIG. 5) can be used to determine marine bottom reflectivity.

Another advantage of the present relates to low frequency contamination. Because the process of this invention works in the frequency domain, it is straightforward to eliminate low frequencies which are contaminated by waves traveling at low speed in the uppermost strata layer of the ocean bottom (ground roll).

Figure 7:
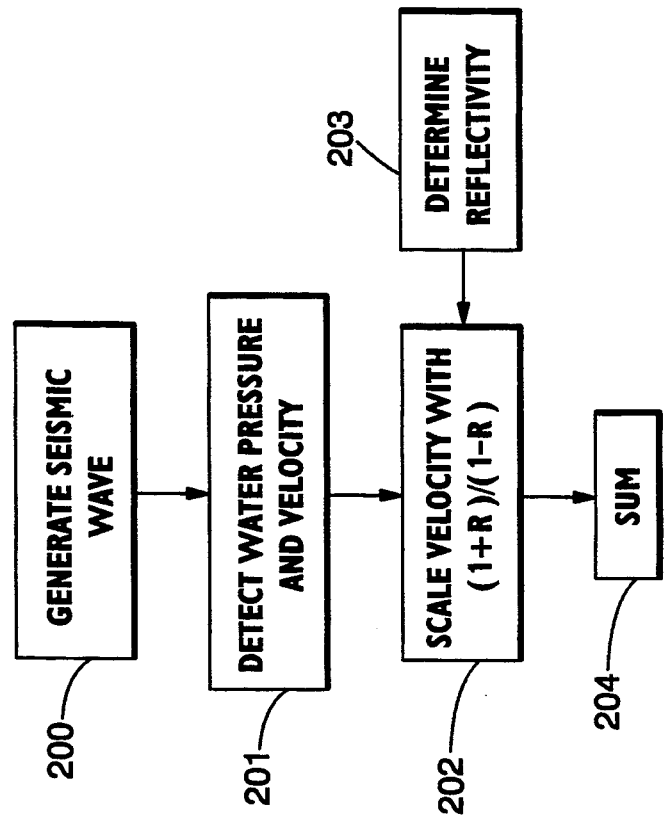
FIG. 7 is a flow diagram of the prior art implementation of the combination of the pressure and velocity traces.

To continue the processing once the ocean bottom reflectivity R is known, the prior art involved scaling the velocity traces with $(1+R)/(1-R)$ and adding them to the pressure traces. This prior art method is shown in the flow diagram of FIG. 7. In block 200, the seismic wave is generated. In block 201, the water pressure and velocity of the wave are detected. In block 202, the velocity signal is scaled with $(1+R)/(1-R)$. Then, in block 203, the ocean bottom reflectivity is determined. Finally, in block 204, the signals are summed. This summation leads to the elimination of the water trapped reverberations. Additionally, the summation transforms the peg-leg reverberation sequence into a scaled simple reverberation sequence as described in the following equation:

$$\text{SUM}(Z) = P(Z) + \frac{1+R}{1-R} V(Z) = \frac{2}{1-R} \sum_{n=1}^{m} Rn(1-R^2) \frac{1}{1+RZ} Z^{\frac{Ten}{Tw}}$$

Inspection of this equation shows that the water trapped reverberations are completely eliminated, including the first water bottom arrival. However, the peg-leg multiples are not completely eliminated but are transformed into a simple scaled reverberation sequence.

A disadvantage of this prior art method is that the factor $2/(1-R)$ leads to a modulation of the sub-surface interface strength with the water bottom reflectivity. This is undesirable if the water bottom reflectivity changes significantly during the survey, as it leads to distortion of the resulting interface data.

The method of the present invention involves a processing sequence that can eliminate the peg-leg reverberation completely by multiplying the summed trace with the inverse Backus filter:

$$UP_1(Z) =$$

$$UP(Z) \times (1+RZ)^2 = (1+RZ) + \sum_{n=1}^{m} Rn(1-R^2)Z^{\frac{Ten}{Tw}}$$

Figure 8:
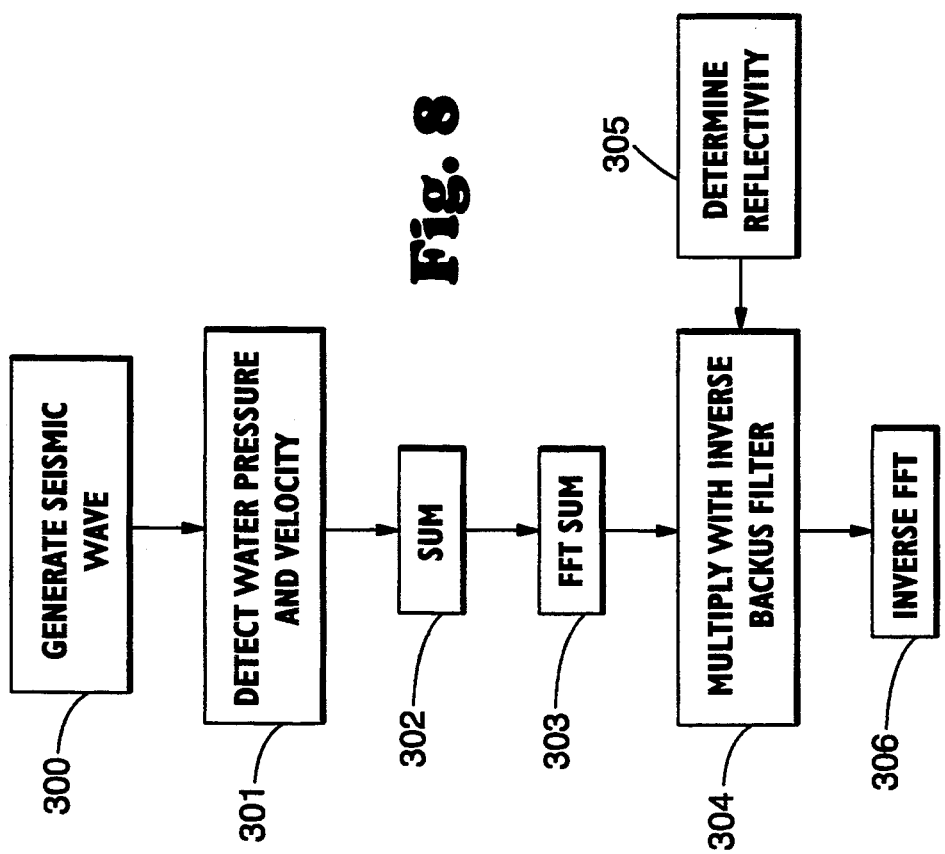
FIG. 8 is a flow diagram of the preferred implementation of the present invention to combine the pressure and velocity traces.

This method is shown in the flow diagram of FIG. 8. In block 300, the seismic wave is generated. In block 301, the water pressure and velocity of the wave are detected. In block 302, the pressure and velocity signals are summed. In block 303, the Fourier transform of the sum is determined. Then, in block 304, the Fourier transform is multiplied with the inverse Backus filter $(1+RZ)^2$. In block 305, the ocean bottom reflectivity is determined. Finally, the inverse Fourier transform is determined in block 306. Using the inverse Backus filter, the first reflection off the water bottom does not vanish and one bounce remains after one round trip through the water layer, which should be inconsequential for the vast majority of practical cases.

The process of multiplying the summed trace with the inverse Backus filter, as described in this application, is very insensitive to the selection of the particular time window once the near surface disturbances are excluded. Because the process works in the frequency domain it is easy to exclude low frequency ground roll from the determination of the water bottom reflectivity by choosing an appropriate frequency band, preferably in the range of 15–80 Hertz.

Although variations in the embodiment of the present invention may not each realize all of the advantages of the invention, certain features may become more important than others in various applications of the invention. The invention, accordingly, should be understood to be limited only by the scope of the appended claims.

What is claimed is:

1. An improved method for determining water bottom reflectivity R in dual sensor seismic surveys, comprising the steps of:
   (a) sensing pressure and velocity using a hydrophone and a geophone in close proximity;
   (b) applying a time window to the pressure and velocity signals;
   (c) summing the time windowed pressure signal and time windowed velocity signal to provide a trace containing only up-going energy;
   (d) transforming the up-going signal from the time domain to the frequency domain;
   (e) calculating the inverse Backus operator $(1+RZ)^2$ where R is the water bottom reflectivity and Z is the two-way travel time of the seismic signal in the water-layer in Z-domain representation;
   (f) multiplying the up-going signal with the inverse Backus operator;
   (g) measuring the power contained in the resulting signal in a selected frequency band width by summing the squared amplitudes of the signal within that frequency band width;
   (h) repeating steps (e)–(g) using different values for water bottom reflectivity;
   (i) selecting the value for water bottom reflectivity which produces the signal with the lowest power in the selected frequency bandwidth.

2. The method of claim 1 wherein the up-going signal is transformed from the time domain to the frequency domain with a fourier transform.

3. The method of claim 1 where the time window is in the range of 0.8 to 2.5 seconds.

4. The method of claim 1 wherein the frequency bandwidth is in the range of 15 to 80 Hertz.

5. A method to combine the pressure and velocity signals to eliminate first-order peg-leg multiples while retaining the first reflection off the ocean bottom comprising the steps of:
   (a) determining the value for ocean bottom reflectivity;
   (b) summing the velocity and the pressure signals to provide a trace containing only up-going energy;
   (c) transforming the up-going energy trace from the time domain to the frequency domain;
   (d) calculating the inverse Backus operator $(1+RZ)^2$ where R is the water bottom reflectivity determined in step (a) and Z is the two-way travel time of the seismic signal in the water-layer in Z-domain representation;
   (e) multiplying the frequency domain representation of the up-going energy trace with the inverse Backus filter; and
   (f) inverse transforming the filtered trace from the frequency domain to the time domain.

6. An improved method for determining water bottom reflectivity R in dual sensor seismic surveys, comprising the steps of:
   (a) sensing pressure and velocity using a hydrophone and a geophone in close proximity;
   (b) applying a time window to the pressure and velocity signals;
   (c) summing the time windowed pressure signal and time windowed velocity signal to provide a trace containing only up-going energy;
   (d) calculating the inverse Backus operator $(1+RZ)^2$ where R is the water bottom reflectivity and Z is the two-way travel time of the seismic signal in the water-layer in Z-domain representation;
   (e) multiplying the up-going signal with the inverse Backus operator;
   (f) squaring the amplitudes of the resulting signal;
   (g) measuring the power contained in the signal by summing the squared amplitudes of the signal;
   (h) repeating steps (d)–(g) using different values for the water bottom reflectivity;
   (i) selecting the value for water bottom reflectivity which produces the signal with the lowest power.

* * * * *